United States Patent
Jeong et al.

(10) Patent No.: US 9,077,246 B2
(45) Date of Patent: *Jul. 7, 2015

(54) FLYBACK CONVERTER HAVING AUXILIARY SWITCH AND AUXILIARY INDUCTOR

(71) Applicant: SAMSUNG ELECTRO-MECHANICS CO., LTD., Suwon, Gyunggi-do (KR)

(72) Inventors: In Wha Jeong, Gyunggi-do (KR); Bum Seok Suh, Gyunggi-do (KR); Kwang Soo Kim, Gyunggi-do (KR)

(73) Assignee: SAMSUNG ELECTRO-MECHANICS CO., LTD., Suwon, Gyunggi-Do (KR)

( * ) Notice: Subject to any disclaimer, the term of this patent is extended or adjusted under 35 U.S.C. 154(b) by 193 days.

This patent is subject to a terminal disclaimer.

(21) Appl. No.: 13/794,036

(22) Filed: Mar. 11, 2013

(65) Prior Publication Data

US 2014/0177288 A1  Jun. 26, 2014

(30) Foreign Application Priority Data

Dec. 20, 2012 (KR) .................. 10-2012-0149349

(51) Int. Cl.
*H02M 3/28* (2006.01)
*H02M 3/335* (2006.01)

(52) U.S. Cl.
CPC .......... *H02M 3/285* (2013.01); *H02M 3/33507* (2013.01); *H02M 3/33569* (2013.01)

(58) Field of Classification Search
CPC ....... H02M 1/34; H02M 1/44; H02M 1/4258; H02M 3/285; H02M 3/335; H02M 2001/342
USPC .................. 363/21.12–21.18, 65, 69
See application file for complete search history.

(56) References Cited

U.S. PATENT DOCUMENTS 5,206,800 A * 4/1993 Smith ........................ 363/21.14
5,267,133 A * 11/1993 Motomura et al. ........ 363/21.03
5,331,533 A * 7/1994 Smith ............................. 363/20

(Continued)

FOREIGN PATENT DOCUMENTS

KR           6-36392        5/1994
KR    10-2011-0105919 A    9/2011

*Primary Examiner* — Timothy J Dole
*Assistant Examiner* — Yusef Ahmed
(74) *Attorney, Agent, or Firm* — McDermott Will & Emery LLP

(57) ABSTRACT

There is provided a flyback converter, including: a power supply unit supplying input power; a transformer unit including first and second transformers converting first and second primary current from the power supply unit into first and second secondary current, respectively; a main switch unit including first and second main switches respectively intermitting the first and second primary current flowing in respective primary windings of the first and second transformers; an auxiliary switch unit including first and second auxiliary switches forming respective transfer paths for dump power present before the first and second main switches are switched on; and an auxiliary inductor unit including first and second auxiliary inductors respectively adjusting the amount of current flowing in the first and second auxiliary switches during the switching operation thereof, wherein the first and second main switches perform a switching operation while having a predetermined phase difference therebetween.

16 Claims, 6 Drawing Sheets

(56) References Cited

U.S. PATENT DOCUMENTS

| | | | |
|---|---|---|---|
| 5,796,595 A * | 8/1998 | Cross | 363/71 |
| 6,005,782 A * | 12/1999 | Jain et al. | 363/21.12 |
| 6,061,253 A * | 5/2000 | Igarashi et al. | 363/19 |
| 6,069,803 A * | 5/2000 | Cross | 363/21.14 |
| 6,108,218 A * | 8/2000 | Igarashi et al. | 363/21.16 |
| 6,239,989 B1 * | 5/2001 | Ming-Ching | 363/20 |
| 6,339,262 B1 * | 1/2002 | Igarashi et al. | 307/39 |
| 6,359,795 B1 * | 3/2002 | Amantea et al. | 363/21.01 |
| 6,473,318 B1 * | 10/2002 | Qian et al. | 363/21.16 |
| 6,671,188 B2 * | 12/2003 | Morita | 363/21.01 |
| 8,593,830 B2 * | 11/2013 | Huynh | 363/21.01 |
| 8,711,588 B1 * | 4/2014 | Jeong et al. | 363/65 |
| 2001/0019490 A1 * | 9/2001 | Igarashi et al. | 363/19 |
| 2002/0126509 A1 * | 9/2002 | Liang | 363/16 |
| 2004/0042237 A1 * | 3/2004 | Hsieh | 363/21.08 |
| 2004/0156217 A1 * | 8/2004 | Phadke | 363/21.16 |
| 2005/0073861 A1 * | 4/2005 | Ke et al. | 363/20 |
| 2005/0174811 A1 * | 8/2005 | Liu et al. | 363/21.01 |
| 2009/0257255 A1 * | 10/2009 | Zhang | 363/50 |
| 2010/0067259 A1 * | 3/2010 | Liu | 363/21.01 |
| 2012/0069607 A1 * | 3/2012 | Shekhawat et al. | 363/21.05 |
| 2013/0063982 A1 * | 3/2013 | Ye et al. | 363/17 |
| 2013/0343098 A1 * | 12/2013 | Kern et al. | 363/21.12 |

* cited by examiner

SWITCHING TURN-ON TIME    SWITCHING TURN-ON TIME

FLYBACK CONVERTER HAVING AUXILIARY SWITCH AND AUXILIARY INDUCTOR

CROSS-REFERENCE TO RELATED APPLICATIONS

This application claims the priority of Korean Patent Application No. 10-2012-0149349 filed on Dec. 20, 2012, in the Korean Intellectual Property Office, the disclosure of which is incorporated herein by reference.

BACKGROUND OF THE INVENTION

1. Field of the Invention

The present invention relates to an interleaved flyback converter capable of decreasing switching loss.

2. Description of the Related Art

Generally, since a flyback converter may be simply configured, as compared to other converters, it has been mainly used as a small-capacity DC-DC converter requiring electrical insulation.

However, a flyback converter may have high switching loss and low efficiency due to leakage inductance of an isolation transformer. Therefore, there are limitations in using a flyback converter as a medium-capacity DC-DC converter.

In the case in which the isolation transformer is designed to have low leakage inductance in order to improve efficiency of the flyback converter, reverse-recovery current an output rectifying diode on a secondary side of the isolation transformer increases. In this case, switching loss on a primary side of the isolation transformer and an electromagnetic interference (EMI) noise level may be increased.

In order to solve the problems inherent in the above-mentioned flyback converter, an interleaved flyback converter has been introduced.

An interleaved flyback converter has a structure in which two or more isolated flyback converters according to the related art are connected to one another in parallel. The interleaved flyback converter operates so that respective flyback converters connected to one another in parallel uniformly share total output power. Therefore, the interleaved flyback converter may decrease ripple of input current and ripple of output voltage at the same time.

However, the interleaved flyback converter having improved characteristics as compared to the flyback converter according to related art also has a problem in that when output capacity of the DC-DC converter increases, the switching loss of a switch on the primary side of the isolation transformer increases significantly.

Patent Document 1 described in the following related art document relates to the interleaved flyback converter, but fails to disclose a configuration for improving switching efficiency at the time of power conversion.

RELATED ART DOCUMENT (Patent Document 1) Korean Patent Laid-Open Publication No. 2011-0105919

SUMMARY OF THE INVENTION

An aspect of the present invention provides an interleaved flyback converter capable of decreasing switching loss generated during switching for power conversion by transferring dump power to a ground before switching.

Another aspect of the present invention provides an interleaved flyback converter capable of decreasing an electromagnetic interference (EMI) noise level.

According to an aspect of the present invention, there is provided a flyback converter, including: a power supply unit supplying input power; a transformer unit including a first transformer converting a first primary current from the power supply unit into a first secondary current and a second transformer converting a second primary current from the power supply unit into a second secondary current; a main switch unit including a first main switch intermitting the first primary current flowing in a primary winding of the first transformer and a second main switch intermitting the second primary current flowing in a primary winding of the second transformer; an auxiliary switch unit including a first auxiliary switch forming a transfer path for dump power present before the first main switch is switched on and a second auxiliary switch forming a transfer path for dump power present before the second main switch is switched on; and an auxiliary inductor unit including a first auxiliary inductor adjusting an amount of current flowing in the first auxiliary switch during a switching operation of the first auxiliary switch and a second auxiliary inductor adjusting an amount of current flowing in the second auxiliary switch during a switching operation of the second auxiliary switch, wherein the first main switch and the second main switch perform a switching operation while having a predetermined phase difference therebetween.

The flyback converter may further include a first rectifier diode rectifying the first secondary current of the first transformer to output the rectified current; and a second rectifier diode rectifying the second secondary current of the second transformer to output the rectified current.

The flyback converter may further include a capacitor element stabilizing power transferred from the first rectifier diode and the second rectifier diode.

The first auxiliary switch may perform a first switching operation in which the first auxiliary switch is switched on before the first main switch is switched on and is switched off before the first main switch is switched off.

The second auxiliary switch may perform a second switching operation in which the second auxiliary switch is switched on before the second main switch is switched on and is switched off before the second main switch is switched off.

The first main switch and the second main switch in the main switch unit may perform the switching operation while having a phase difference of 180° therebetween.

The first auxiliary inductor and the primary winding of the first transformer may be inductively coupled to each other and the second auxiliary inductor and the primary winding of the second transformer may be inductively coupled to each other.

The flyback converter may further include a magnetic core shared by the first auxiliary inductor and the first transformer.

According to another aspect of the present invention, there is provided a flyback converter, including: a power supply unit supplying input power; a first transformer connected to one terminal of the power supply unit to convert a first primary current from the power supply unit into a first secondary current; a second transformer connected to one terminal of the power supply unit in parallel to convert a second primary current from the power supply unit into a second secondary current; a main switch unit including a first main switch intermitting the first primary current flowing in a primary winding of the first transformer and a second main switch operating while having a predetermined phase difference from the first main switch and intermitting the second primary current flowing in a primary winding of the second transformer; an auxiliary switch unit including a first auxiliary switch forming a transfer path for dump power present before the first main switch is switched on and a second auxiliary switch forming a transfer path for dump power present before the second main switch is switched on; and an auxiliary inductor unit including a first auxiliary inductor adjusting an amount of current flowing in the first auxiliary switch during a switching operation of the first auxiliary switch and a second auxiliary inductor adjusting an amount of current flowing in the second auxiliary switch during a switching operation of the second auxiliary switch.

The flyback converter may further include a first rectifier diode rectifying the first secondary current of the first transformer to output the rectified current; and a second rectifier diode rectifying the second secondary current of the second transformer to output the rectified current.

The flyback converter may further include a capacitor element stabilizing power transferred from the first rectifier diode and the second rectifier diode.

The first auxiliary switch may perform a first switching operation in which the first auxiliary switch is switched on before the first main switch is switched on and is switched off before the first main switch is switched off.

The second auxiliary switch may perform a second switching operation in which the second auxiliary switch is switched on before the second main switch is switched on and is switched off before the second main switch is switched off.

The first main switch and the second main switch in the main switch unit may perform the switching operation while having a phase difference of 180° therebetween.

The first auxiliary inductor and the primary winding of the first transformer may be inductively coupled to each other, and the second auxiliary inductor and the primary winding of the second transformer may be inductively coupled to each other.

The flyback converter may further include a magnetic core shared by the first auxiliary inductor and the first transformer.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
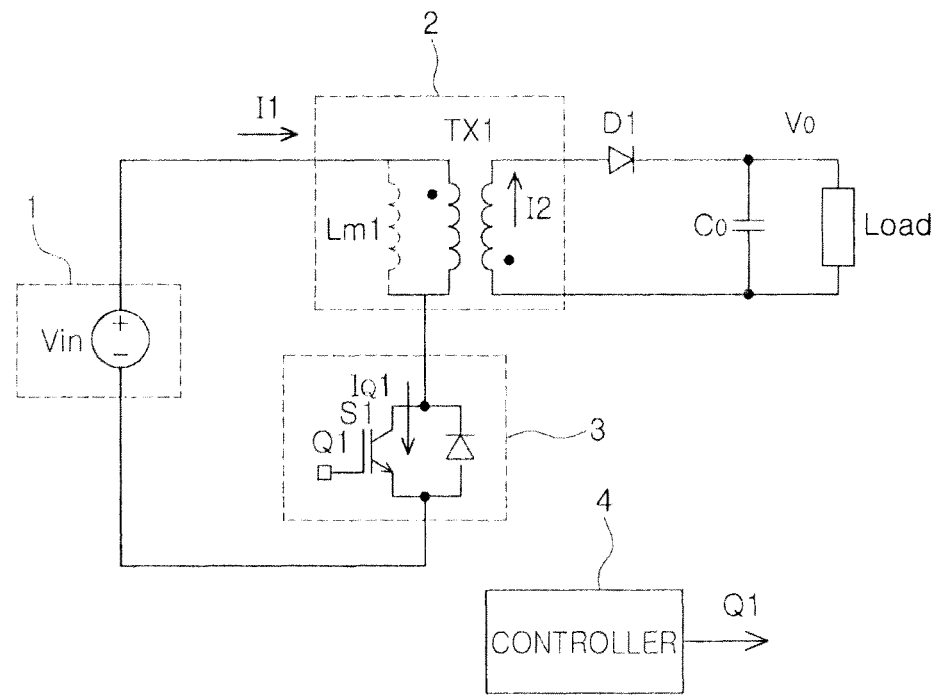
FIG. 1 is a circuit diagram showing an isolated flyback converter.

Hereinafter, embodiments of the present invention will be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same or like reference numerals will be used throughout to designate the same or like elements.

FIG. 1 is a circuit diagram showing an isolated flyback converter.

Referring to FIG. 1, the isolated flyback converter may include a power input unit 1, a transformer 2, a switching element 3, a control unit 4, and a rectifier diode D1.

The power input unit 1 may supply input power.

The transformer 2 may convert a primary current I1 from the power input unit into a secondary current I2.

The switching element 3 may intermit the primary current I1 flowing in a primary winding of the transformer.

The control unit 4 may apply a driving signal Q1 for driving the switching element.

The rectifier diode D1 may rectify the secondary current of the transformer 2.

A capacitor element $C_0$ may stabilize the power transferred from the rectifier diode D1.

The switching element 3 may perform a switching operation so that the flyback converter transfers energy of a primary side of the transformer 2 to a secondary side of the transformer 2.

In this case, switching loss may be generated by the switching operation of the switching element 3. Further, a large amount of stress may be generated at the switching element 3.

Meanwhile, in order to secure zero voltage switching (ZVS) of the switching element 3, energy stored in leakage inductance Lm1 of the isolation transformer needs to have a value higher than energy stored in parasitic capacitance across the switching element. Therefore, in order to secure the zero voltage switching (ZVS) of the switching element 3, an isolation transformer having high leakage inductance is generally used.

However, in the case in which the leakage inductance of the isolation transformer increases, high voltage and current stresses are generated at the switching element 3 and the output rectifier diode D1, such that additional loss is generated. In addition, in order to secure a margin for the above-mentioned voltage and current stresses, a switching element and an output rectifier diode having a high rated capacity need to be used. This leads to an increase in cost of the flyback converter.

Figure 2:
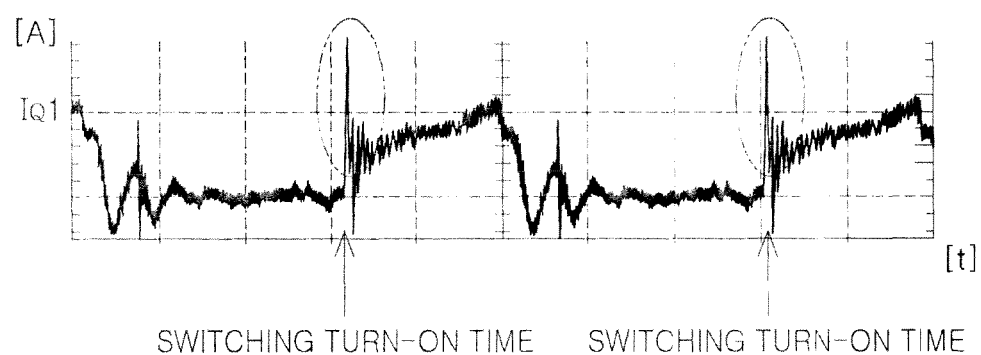
FIG. 2 is a view showing a waveform of current flowing in a switching element of the isolated flyback converter.

FIG. 2 is a view showing a waveform of current flowing in the switching element of the isolated flyback converter.

Referring to FIG. 2, a current IQ1 flowing in the switching element over time may be confirmed. In this case, it is confirmed that very high current is generated at a point at which a switch is turned on. This high current increases the switching loss of the switching element and the stress for the switching element.

Meanwhile, a current spike generated by the leakage inductance of the isolation transformer and a reverse-recovery current of the output rectifier diode increases an electromagnetic interference (EMI) noise level of the flyback converter, thereby increasing cost and size of an EMI filter.

Figure 3:
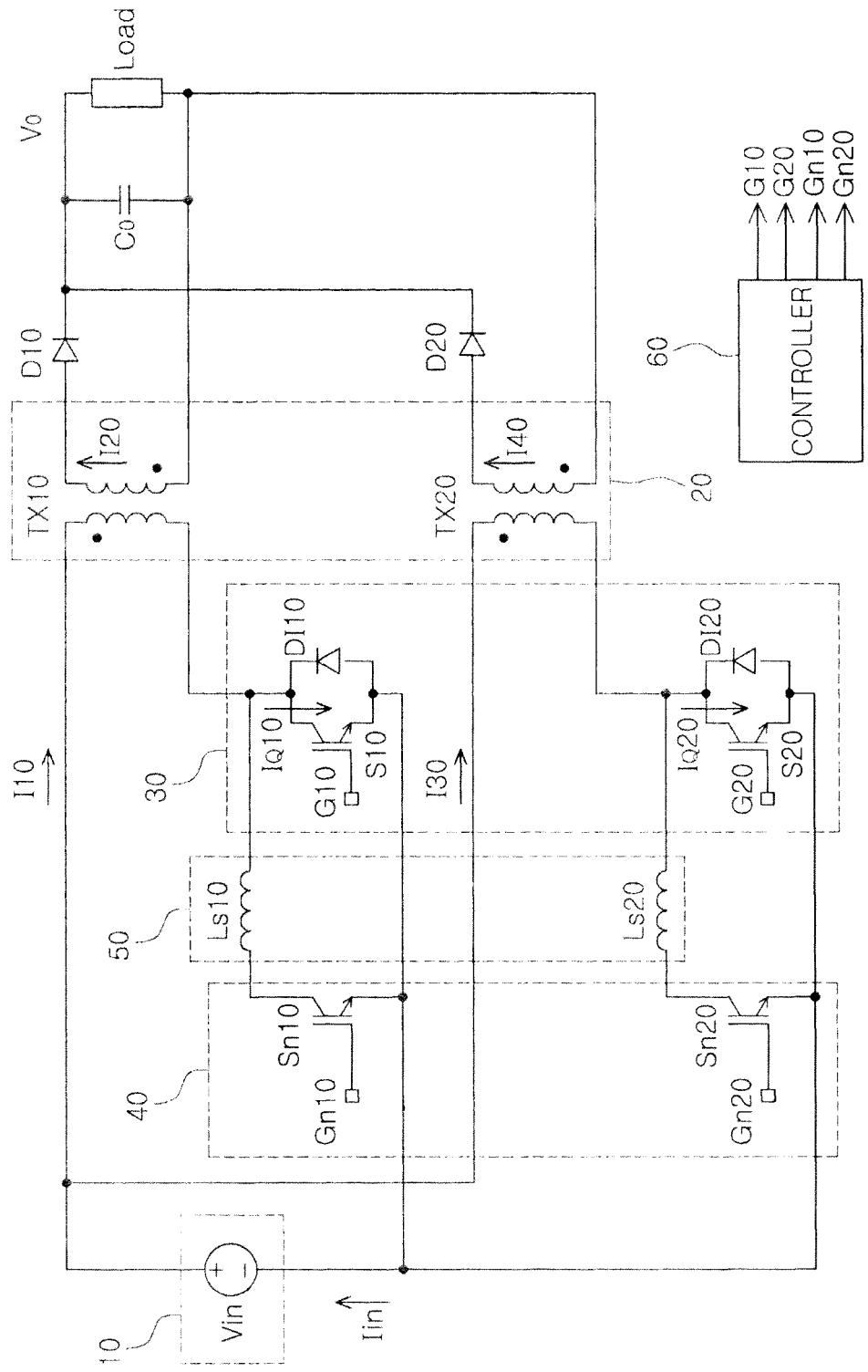
FIG. 3 is a circuit diagram showing a flyback converter according to an embodiment of the present invention.

FIG. 3 is a circuit diagram showing a flyback converter according to an embodiment of the present invention.

Referring to FIG. 3, the flyback converter may include a power supply unit 10, a transformer unit 20, a main switch unit 30, an auxiliary switch unit 40, an auxiliary inductor unit 50, a first rectifier diode D10, and a second rectifier diode D20.

The power supply unit 10 may supply input power.

The transformer unit 20 may include a first transformer TX10 and a second transformer TX20 connected to one another in parallel. Each of the first transformer TX10 and the second transformer TX20 includes a primary winding and a secondary winding.

The first transformer TX10 may be connected to one terminal of the power supply unit 10 to thereby convert a primary current I10 from the power supply unit 10 into a secondary current I20. Here, the primary current is a current flowing in the primary winding of the transformer and the secondary current is a current flowing in the secondary winding of the transformer. In addition, the current flowing in each of the windings of the first transformer TX10 is defined as a first current.

The second transformer TX20 may be connected to one terminal of the power supply unit 10 to thereby convert a primary current I30 from the power supply unit 10 into a secondary current I40. Here, the primary current is a current flowing in the primary winding of the transformer and the secondary current is a current flowing in the secondary winding of the transformer. In addition, the current flowing in each of the windings of the second transformer TX20 is defined as a second current.

The main switch unit 30 may intermit the current flowing in the primary winding of the transformer unit 20. Due to switching of the main switch unit 30, the interleaved flyback converter may transfer energy from a primary side of the transformer unit 20 to a secondary side of the transformer unit 20.

The main switch unit 30 may include a first main switch S10 and a second main switch S20.

The first main switch S10 may intermit the first primary current flowing in the primary winding of the first transformer TX10. Due to switching of the first main switch S10, the interleaved flyback converter may transfer energy from a primary side of the first transformer TX10 to a secondary side of the first transformer TX10.

The second main switch S20 may intermit the second primary current flowing in the primary winding of the second transformer TX20. Due to switching of the second main switch S20, the interleaved flyback converter may transfer energy from a primary side of the second transformer TX20 to a secondary side of the second transformer TX20.

The first main switch S10 and the second main switch S20 may perform a switching operation while having a predetermined phase difference therebetween. For example, the first main switch S10 and the second main switch S20 may perform the switching operation while having a phase difference of 180° therebetween.

The main switch unit 30 may include a first reverse current preventing diode DI10 and a second reverse current preventing diode DI20. The first reverse current preventing diode DI10 may prevent reverse current in the first main switch S10. The second reverse current preventing diode DI20 may prevent reverse current in the second main switch S20.

The first reverse current preventing diode DI10 and the second reverse current preventing diode DI20 may be diodes formed in a body in the case in which the first main switch S10 and the second main switch S20 is configured of a transistor. However, the reverse current preventing diodes DI10 and P120 are not limited thereto, but may be separately added diodes.

The first rectifier diode D10 may rectify the first secondary current I20 of the first transformer TX10 to transfer the rectified current to an output unit. The second rectifier diode D20 may rectify the second secondary current I40 of the second transformer TX20 to transfer the rectified current to the output unit.

Meanwhile, the flyback converter according to the embodiment of the present invention may include a power stabilizing capacitor element $C_0$. The capacitor element $C_0$ may stabilize the power transferred from the first rectifier diode D10 and the second rectifier diode D20.

The auxiliary switch unit 40 may form a transfer path for dump power remaining during the switching operation of the main switch unit 30.

The auxiliary switch unit 40 may include a first auxiliary switch Sn10 and a second auxiliary switch Sn20. The first auxiliary switch Sn10 may be connected to the first main switch S10 in parallel. The second auxiliary switch Sn20 may be connected to the second main switch S20 in parallel.

The auxiliary inductor unit 50 may adjust an amount of current flowing in the auxiliary switch unit 40 during the switching operation of the auxiliary switch unit 40. For example, a first auxiliary inductor Ls10 may adjust an amount of current flowing in the first auxiliary switch Sn10 during the switching operation of the first auxiliary switch Sn10. In addition, a second auxiliary inductor Ls20 may adjust an amount of current flowing in the second auxiliary switch Sn20 during the switching operation of the second auxiliary switch Sn20.

The control unit 60 may provide switching control signals G10, G20, Gn10, and Gn20 controlling the switching operations of the first main switch S10, the second main switch S20, the first auxiliary switch Sn10, and the second auxiliary switch Sn20.

The first main switch S10, the second main switch S20, the first auxiliary switch Sn10, and the second auxiliary switch Sn20 according to the embodiment of the present invention may be configured of one of an insulated gate bipolar transistor (IGBT), a metal oxide semiconductor field-effect transistor (MOS-FET) and a bipolar junction transistor (BJT).

Figure 4:
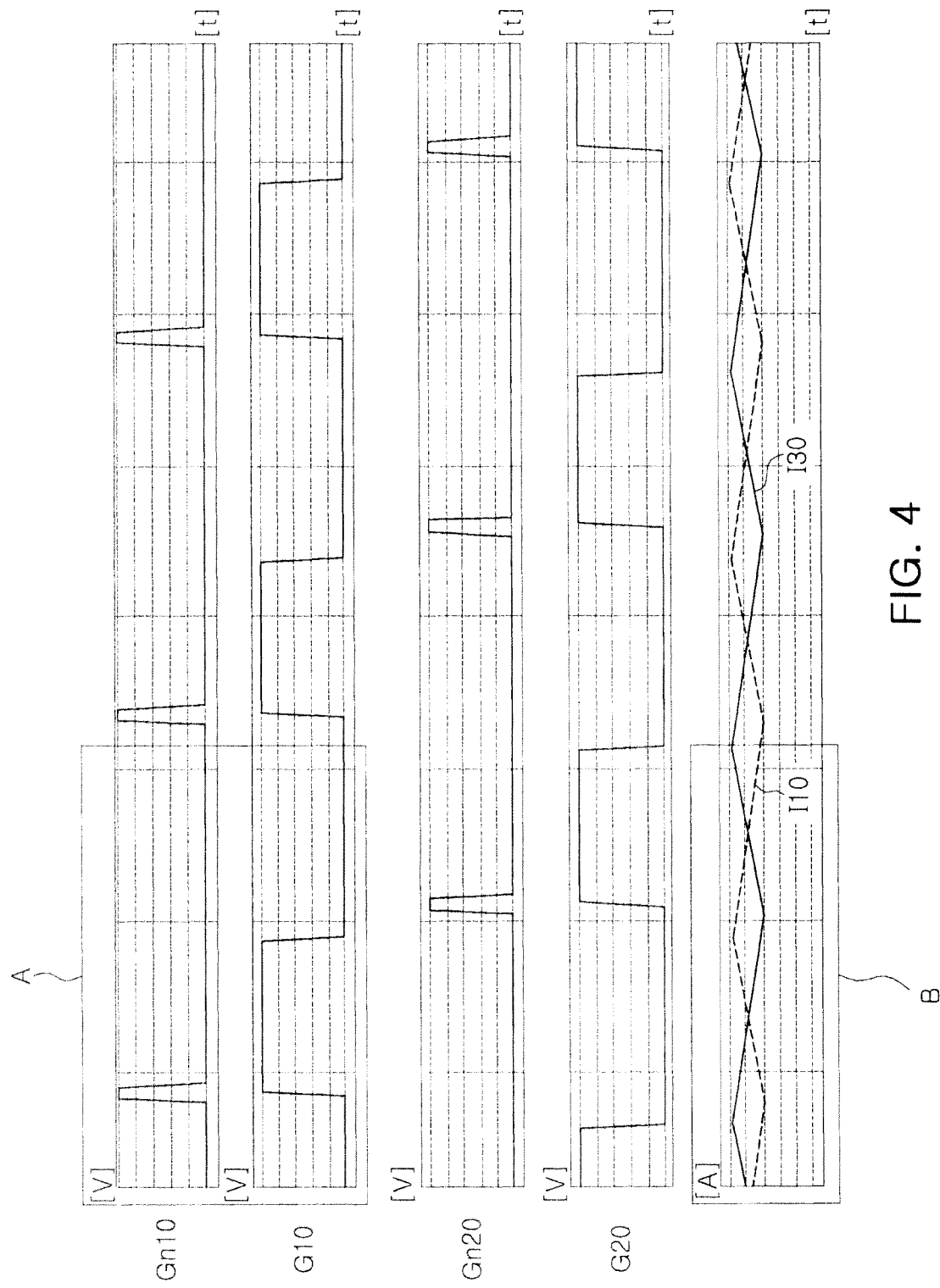
FIG. 4 is a switching control signal graph of a main switch unit and an auxiliary switch unit.
Figure 5:
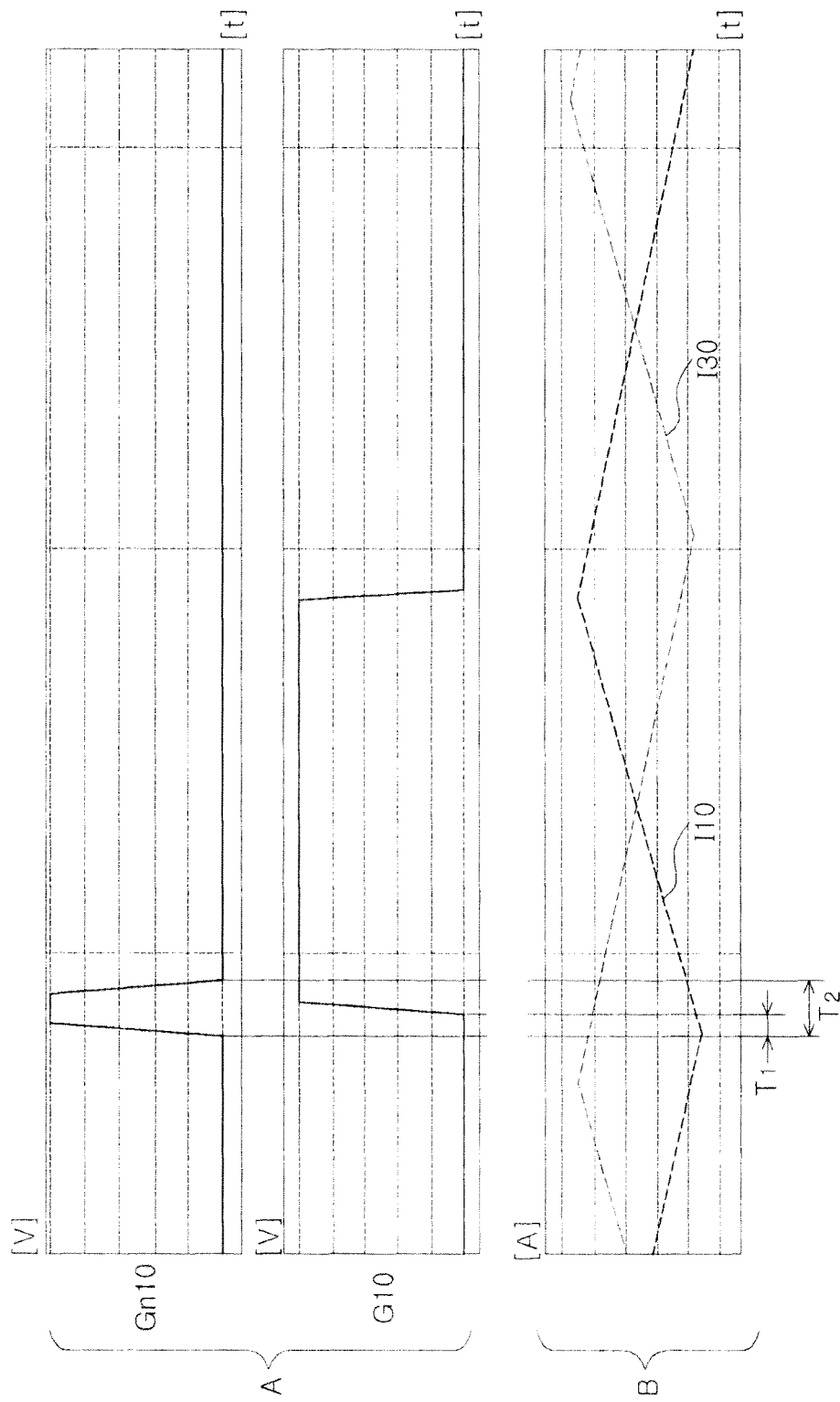
FIG. 5 is an enlarged graph of parts A and B of FIG. 4.

FIG. 4 is a switching control signal graph of the main switch unit 30 and the auxiliary switch unit 40, and FIG. 5 is an enlarged graph of parts A and B of FIG. 4.

Referring to FIGS. 3 through 5, the auxiliary switch unit 40 of the flyback converter according to the embodiment of the present invention may form a transfer path for dump power before the main switch unit 30 is switched on. That is, the switching loss may be removed by providing a zero voltage switching condition of the main switch unit 30.

In order to form the transfer path for the dump power, the control unit 60 may transfer the switching control signals G10, G20, Gn10, and Gn20 allowing the auxiliary switch unit 40 to be switched on before the main switch unit 30 is switched on. When the control signal is a high signal, each of the switches S10, S20, Sn10, and Sn20 is switched on and when the control signal is a low signal, each of the switches S10, S20, Sn10, and Sn20 is switched off.

More specifically, the first auxiliary switch Sn10 may form the transfer path for the dump power present before the first main switch S10 is switched on and the second auxiliary switch Sn20 may form the transfer path for the dump power present before the second main switch S20 is switched on.

To this end, as shown in FIGS. 4 and 5, the first auxiliary switch Sn10 may be switched on before the first main switch S10 is switched on and may be switched off before the first main switch S10 is switched off. This is referred to as a first switching operation. Meanwhile, the first main switch S10 may be switched on once a predetermined time T1 has elapsed after the first auxiliary switch Sn10 has been switched on. In addition, the first auxiliary switch Sn10 may be switched on for a predetermined time T2.

The times T1 and T2 may be determined by operational characteristics of the flyback switch, a gate voltage level, a gate resistance value, inductance of an auxiliary inductor, and the like.

In addition, the second auxiliary switch Sn20 may be switched on before the second main switch S20 is switched on and may be switched off before the second main switch S20 is switched off. This refers to as a second switching operation.

Here, switched-on intervals in the first and second switching operations may be set to be the same.

Referring to part B shown in FIGS. 4 and 5, in the case in which the first main switch S10 is switched on, the current I10 flowing in the primary winding of the first transformer TX10 increases. In addition, in the case in which the first main switch S10 is switched off, the current I10 flowing in the primary winding of the first transformer TX10 decreases. In addition, in the case in which the second main switch S20 is switched on, the current I30 flowing in the primary winding of the second transformer TX20 increases. In addition, in the case in which the second main switch S20 is switched off, the current I30 flowing in the primary winding of the second transformer TX20 decreases.

Meanwhile, although the auxiliary switch unit 40 may form the transfer path for the dump power of the main switch unit 30 to decrease the switching loss of the main switch unit 30, the switching loss of the auxiliary switch unit 40 may be generated.

In other words, peak voltage according to transient power at a point at which the auxiliary switch unit 40 is switched off is generated across the auxiliary switch unit 40, such that the switching loss may be generated.

In order to solve the above-mentioned problem, referring to FIG. 3, the flyback converter according the embodiment of the present invention may further include the auxiliary inductor unit 50 adjusting an amount of current flowing in the auxiliary switch unit 40 during the switching operation of the auxiliary switch unit 40.

The auxiliary inductor unit 50 may include the first auxiliary inductor Ls10 and the second auxiliary inductor Ls20. Specifically, the first auxiliary inductor Ls10 may adjust an amount of current flowing in the first auxiliary switch Sn10 during the switching operation of the first auxiliary switch Sn10. In addition, the second auxiliary inductor Ls20 may adjust an amount of current flowing in the second auxiliary switch Sn20 during the switching operation of the second auxiliary switch Sn20.

As described above, the flyback converter according to the embodiment of the present invention may implement the zero voltage switching of the main switch unit 30 by the auxiliary switch unit 40. Therefore, the flyback converter according to the embodiment of the present invention may decrease the switching loss, thereby significantly improve efficiency of the converter. The leakage inductance of the isolation transformer may be minimized by the zero voltage switching.

Figure 6:
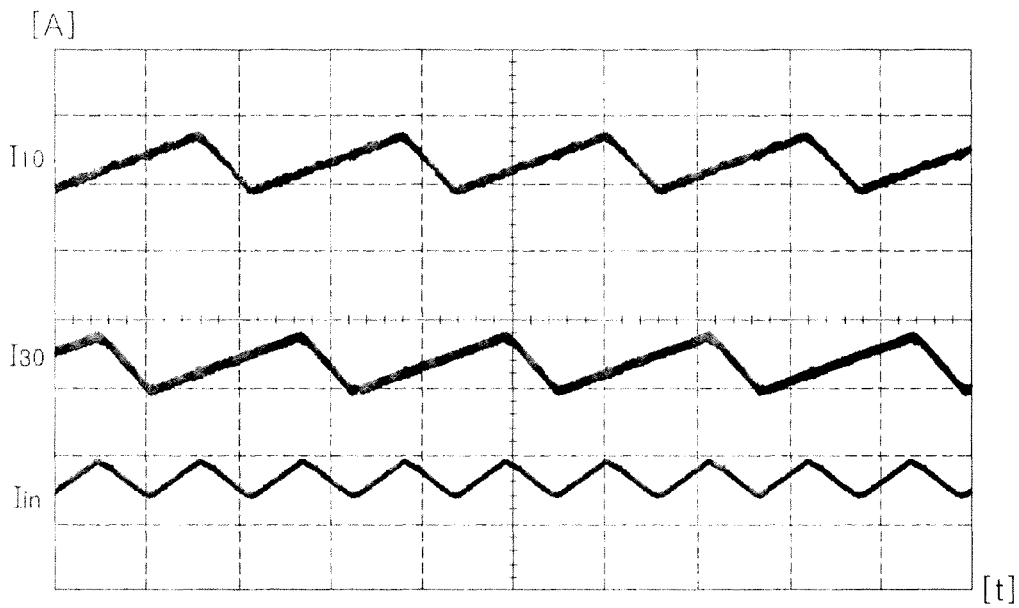
FIG. 6 is a view showing input current of the flyback converter according to the embodiment of the present invention.

FIG. 6 is a view showing input current of the flyback converter according to the embodiment of the present invention.

Referring to FIG. 6, the current I10 flowing in the primary winding of the first transformer TX10 and the current I30 flowing in the primary winding of the second transformer TX20 may be confirmed.

As described above, the first primary current I10 and the second primary current I30 may be controlled to generate a phase difference of 180°.

Meanwhile, it may be confirmed that a ripple of input current Iin of the converter may be significantly decreased by cancellation of the first primary current I10 and the second primary current I30.

The interleaved flyback converter according to the embodiment of the present invention may further decrease the ripple of the input current as compared to the interleaved flyback converter according to the related art.

Figure 7:
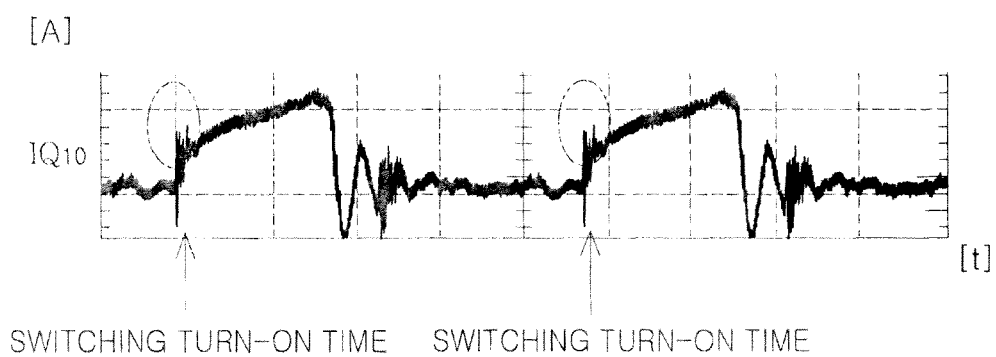
FIG. 7 is a view showing a current waveform of a first main switch of the flyback converter according to the embodiment of the present invention.

FIG. 7 is a view showing a current waveform of the first main switch S10 of the flyback converter according to the embodiment of the present invention.

When the current waveform of FIG. 2 is compared with the current waveform of FIG. 7, it may be confirmed that a spike current is significantly decreased in the present embodiment.

Referring to FIGS. 6 and 7, according to the embodiment of the present invention, it is confirmed that the switching loss and the stress of the main switch unit may be decreased, and the EMI noise level generated from the converter may be decreased.

Figure 8:
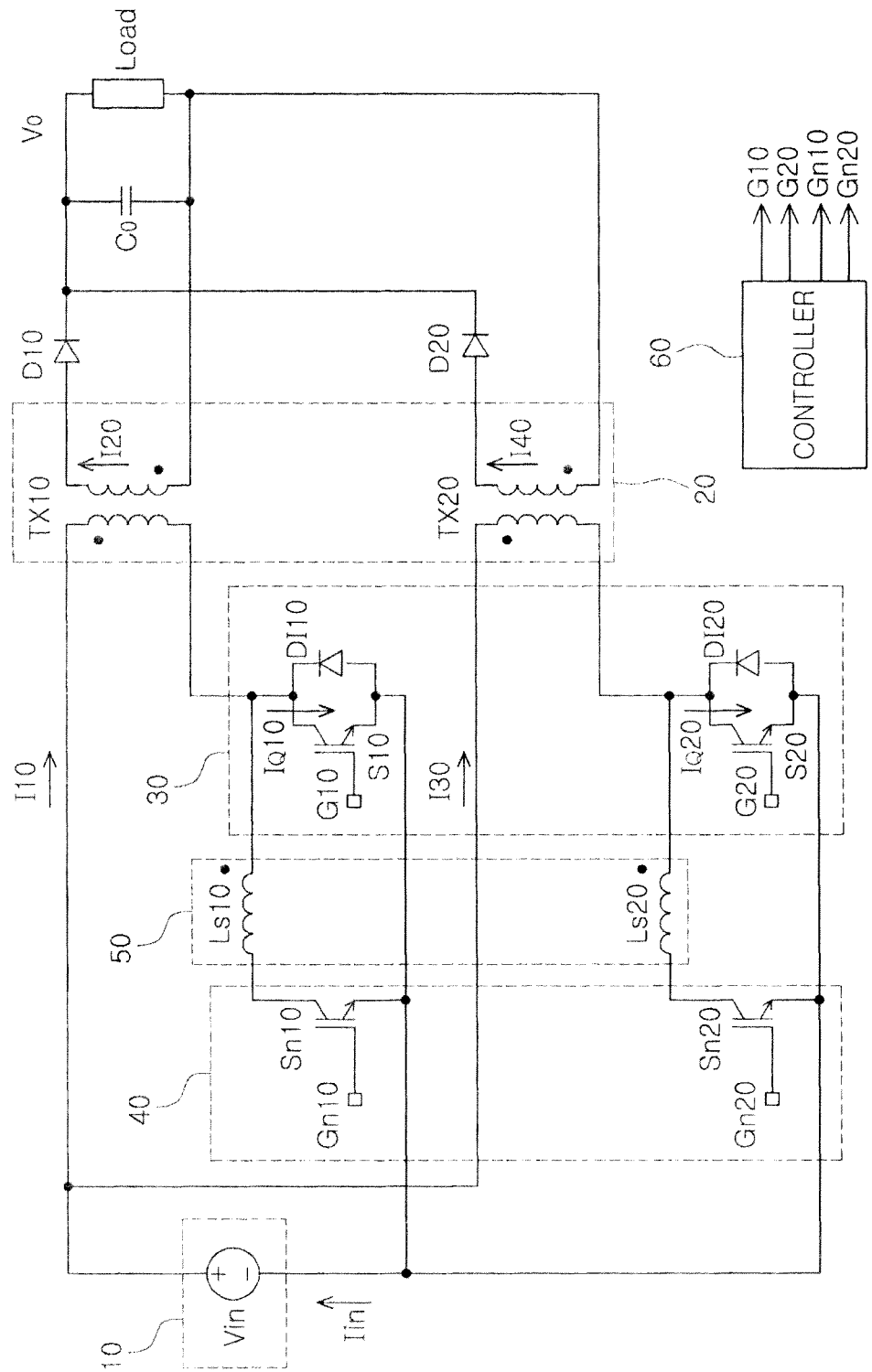
FIG. 8 is a circuit diagram showing a flyback converter according to another embodiment of the present invention.

FIG. 8 is a circuit diagram showing a flyback converter according to another embodiment of the present invention.

Referring to FIG. 8, the first auxiliary inductor Ls10 and the primary winding of the first transformer TX10 may be inductively coupled to each other, and the second auxiliary inductor Ls20 and the primary winding of the second transformer TX20 may be inductively coupled to each other.

In addition, the first auxiliary inductor Ls10 and the first transformer TX10 may share a single core. In addition, the second auxiliary inductor Ls20 and the second transformer TX20 may share a single core.

The core may be a magnetic core. The magnetic core may be an iron core or a ferrite core.

According to the embodiment of the present invention, at the point at which the auxiliary switches Sn10 and Sn20 are switched off, the energy stored in the auxiliary inductors Ls10 and Ls20 may be transferred to the transformers TX10 and TX20.

As described above, the spike voltage is limited to a low value by energy coupling between the auxiliary inductors Ls10 and Ls20 and the transformers TX10 and TX20.

According to the embodiment of the present invention, the energy of the auxiliary inductor may be recycled through a coupled core at the point at which the auxiliary switch is turned off by inductively coupling the auxiliary inductor and the transformer, whereby the efficiency of the converter may be additionally improved and the EMI noise reduction may be obtained.

As set forth above, an interleaved flyback converter capable of decreasing switching loss generated during switching for power conversion by transferring dump power to a ground before the switching may be provided.

Further, an interleaved flyback converter capable of decreasing an EMI noise level may be provided.

While the present invention has been shown and described in connection with the embodiments, it will be apparent to those skilled in the art that modifications and variations can be made without departing from the spirit and scope of the invention as defined by the appended claims.

What is claimed is:
1. A flyback converter, comprising:
a power supply unit supplying input power;
a transformer unit including a first transformer converting a first primary current from the power supply unit into a first secondary current and a second transformer con- verting a second primary current from the power supply unit into a second secondary current;

a main switch unit including a first main switch intermitting the first primary current flowing in a primary winding of the first transformer and a second main switch intermitting the second primary current flowing in a primary winding of the second transformer;

an auxiliary switch unit including a first auxiliary switch forming a transfer path for dump power present in the primary winding of the first transformer before the first main switch is switched on and a second auxiliary switch forming a transfer path for dump power present in the primary winding of the second transformer before the second main switch is switched on; and an auxiliary inductor unit including a first auxiliary inductor adjusting an amount of current flowing in the first auxiliary switch during a switching operation of the first auxiliary switch and a second auxiliary inductor adjusting an amount of current flowing in the second auxiliary switch during a switching operation of the second auxiliary switch, wherein the first main switch and the second main switch perform a switching operation while having a predetermined phase difference therebetween, and wherein the first main switch, the first auxiliary inductor, and the first auxiliary switch are disposed in series, and each of both nodes of the first auxiliary inductor is directly connected to the first main switch and the first auxiliary switch, respectively, and the second main switch, the second auxiliary inductor, and the second auxiliary switch are disposed in series, and each of both nodes of the second auxiliary inductor is directly connected to the second main switch and the second auxiliary switch, respectively.

2. The flyback converter of claim 1, further comprising:
a first rectifier diode rectifying the first secondary current of the first transformer to output the rectified current; and
a second rectifier diode rectifying the second secondary current of the second transformer to output the rectified current.

3. The flyback converter of claim 2, further comprising a capacitor element stabilizing power transferred from the first rectifier diode and the second rectifier diode.

4. The flyback converter of claim 1, wherein the first auxiliary switch performs a first switching operation in which the first auxiliary switch is switched on before the first main switch is switched on and is switched off before the first main switch is switched off.

5. The flyback converter of claim 1, wherein the second auxiliary switch performs a second switching operation in which the second auxiliary switch is switched on before the second main switch is switched on and is switched off before the second main switch is switched off.

6. The flyback converter of claim 1, wherein the first main switch and the second main switch in the main switch unit perform the switching operation while having a phase difference of 180° therebetween.

7. The flyback converter of claim 1, wherein the first auxiliary inductor and the primary winding of the first transformer are inductively coupled to each other, and
the second auxiliary inductor and the primary winding of the second transformer are inductively coupled to each other.

8. The flyback converter of claim 1, further comprising a magnetic core shared by the first auxiliary inductor and the first transformer.

9. A flyback converter, comprising:
a power supply unit supplying input power;
a first transformer connected to one terminal of the power supply unit to convert a first primary current from the power supply unit into a first secondary current;
a second transformer connected to one terminal of the power supply unit in parallel to convert a second primary current from the power supply unit into a second secondary current;
a main switch unit including a first main switch intermitting the first primary current flowing in a primary winding of the first transformer and a second main switch operating while having a predetermined phase difference from the first main switch and intermitting the second primary current flowing in a primary winding of the second transformer;
an auxiliary switch unit including a first auxiliary switch forming a transfer path for dump power present in the primary winding of the first transformer before the first main switch is switched on and a second auxiliary switch forming a transfer path for dump power present in the primary winding of the second transformer before the second main switch is switched on; and
an auxiliary inductor unit including a first auxiliary inductor adjusting an amount of current flowing in the first auxiliary switch during a switching operation of the first auxiliary switch and a second auxiliary inductor adjusting an amount of current flowing in the second auxiliary switch during a switching operation of the second auxiliary switch,
wherein the first main switch, the first auxiliary inductor, and the first auxiliary switch are disposed in series, and each of both nodes of the first auxiliary inductor is directly connected to the first main switch and the first auxiliary switch, respectively, and the second main switch, the second auxiliary inductor, and the second auxiliary switch are disposed in series, and each of both nodes of the second auxiliary inductor is directly connected to the second main switch and the second auxiliary switch, respectively.

10. The flyback converter of claim 9, further comprising:
a first rectifier diode rectifying the first secondary current of the first transformer to output the rectified current; and
a second rectifier diode rectifying the second secondary current of the second transformer to output the rectified current.

11. The flyback converter of claim 10, further comprising a capacitor element stabilizing power transferred from the first rectifier diode and the second rectifier diode.

12. The flyback converter of claim 9, wherein the first auxiliary switch performs a first switching operation in which the first auxiliary switch is switched on before the first main switch is switched on and is switched off before the first main switch is switched off.

13. The flyback converter of claim 9, wherein the second auxiliary switch performs a second switching operation in which the second auxiliary switch is switched on before the second main switch is switched on and is switched off before the second main switch is switched off.

14. The flyback converter of claim 9, wherein the first main switch and the second main switch in the main switch unit perform the switching operation while having a phase difference of 180° therebetween.

15. The flyback converter of claim 9, wherein the first auxiliary inductor and the primary winding of the first transformer are inductively coupled to each other, and the second auxiliary inductor and the primary winding of the second transformer are inductively coupled to each other.

16. The flyback converter of claim 9, further comprising a magnetic core shared by the first auxiliary inductor and the first transformer.

* * * * *